US006733166B2

(12) United States Patent
Hulse

(10) Patent No.: US 6,733,166 B2
(45) Date of Patent: May 11, 2004

(54) ILLUMINATED INTERIOR ARTICLE SYSTEM UTILIZING A Y-BRANCH WAVEGUIDE

(75) Inventor: George Robert Hulse, Cookeville, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 89 days.

(21) Appl. No.: 10/097,697

(22) Filed: Mar. 13, 2002

(65) Prior Publication Data

US 2002/0102058 A1 Aug. 1, 2002

Related U.S. Application Data

(63) Continuation-in-part of application No. 09/828,741, filed on Apr. 9, 2001, now Pat. No. 6,554,462, which is a division of application No. 09/109,051, filed on Jul. 2, 1998, now Pat. No. 6,238,074, which is a continuation-in-part of application No. 09/009,836, filed on Jan. 20, 1998, now Pat. No. 6,168,302.
(60) Provisional application No. 60/069,118, filed on Dec. 9, 1997.

(51) Int. Cl.$^7$ ............................................... G09F 13/00
(52) U.S. Cl. .......................... 362/551; 362/26; 362/31; 362/33; 362/511; 362/556; 362/558; 362/561; 385/140
(58) Field of Search ............................. 385/42, 43, 45, 385/96, 51, 31; 362/31, 80; 350/96.15

(56) References Cited

U.S. PATENT DOCUMENTS

| | | | |
|---|---|---|---|
| 2,259,910 A | 10/1941 | Rylsky | |
| 4,556,279 A | 12/1985 | Shaw et al. | |
| 4,721,350 A | 1/1988 | Mori | |

(List continued on next page.)

OTHER PUBLICATIONS

Hulse, George R. et al., SAE Technical Paper Series 981189 "Analysis of Waveguide Geometries at Bends and Braches for the Directing of Light," pp. 1–5, International Congress and Exposition, Detoit, MI, Feb. 1998.

Hulse, George R. et al., SAE Technical Paper Series 1999–01–0301, "Analysis Waveguide Geometries at Connection Interfaces to Determine Losses," pp. 1–6 International Congress and Exposition, Detroit, MI, Mar. 1999.

*Primary Examiner*—Audrey Chang
*Assistant Examiner*—Craig Curtis
(74) *Attorney, Agent, or Firm*—Reising, Ethington, Barnes, Kisselle, P.C.

(57) ABSTRACT

An illuminated interior article system (10) which can be used as a part of a vehicle interior lighting system and which includes a branching optical waveguide (12) and a vehicle interior article (14) positioned relative to waveguide such that the illuminating light exiting the waveguide at its junction (16) illuminates the vehicle interior article. The branching waveguide (12) has a stem (18), first and second branches (20,22), and the junction (16) that couples the stem to each of the branches. The first and second branches (20,22) extend away from the junction (16) at an obtuse angle relative to the stem (18) and the junction includes one or more optical features positioned at the junction such that a portion of the light traveling through one or more of the waveguide sections impinges upon the optical feature(s), with the optical feature(s) redirecting the impinging light out of the waveguide at the junction to thereby provide illuminating light from the junction. Various types of optical features are disclosed, including notches (122), stipplings (132), optical coatings (46,50), or outer surface configurations that are geometrically oriented to reflect light out of the waveguide (12).

22 Claims, 6 Drawing Sheets

U.S. PATENT DOCUMENTS

| | | |
|---|---|---|
| 4,760,580 A | 7/1988 | Thompson et al. |
| 4,832,430 A | 5/1989 | Tada et al. |
| 5,369,554 A * | 11/1994 | Erion .......................... 362/31 |
| 5,432,876 A | 7/1995 | Appeldorn et al. |
| 5,452,186 A | 9/1995 | Dassanayake |
| 5,465,194 A | 11/1995 | Currie |
| 5,515,244 A | 5/1996 | Levins et al. |
| 5,675,679 A | 10/1997 | Yuuki |
| 5,757,990 A | 5/1998 | Miyakawa |
| 5,757,995 A | 5/1998 | Chen et al. |
| 5,927,849 A | 7/1999 | Cassarly et al. |

* cited by examiner

ILLUMINATED INTERIOR ARTICLE SYSTEM UTILIZING A Y-BRANCH WAVEGUIDE

CROSS-REFERENCE TO RELATED APPLICATIONS

This patent application is a continuation-in-part of U.S. Ser. No. 09/828,741, filed Apr. 9, 2001 now U.S. Pat. No. 6,554,462, which is a divisional of U.S. Ser. No. 09/109,051, filed Jul. 2, 1998, now U.S. Pat. No. 6,238,074, which is a continuation-in-part of U.S. Ser. No. 09/009,836, filed Jan. 20, 1998, now U.S. Pat. No. 6,168,302, and which claims the priority of provisional application Ser. No. 60/069,118, filed, Dec. 9, 1997.

TECHNICAL FIELD

This invention relates generally to waveguides used in vehicle illumination and, in particular, to branching optical junctions used in vehicle interior illumination.

BACKGROUND OF THE INVENTION

Traditionally, interior vehicle lighting has been accomplished by utilizing individual incandescent bulbs or other such light sources which are each dedicated to a single lighting function. The bulbs are placed at various locations throughout the vehicle where the illumination is needed and are energized by electrical power delivered via individual wires. As a result of the growing number of lighting applications within the vehicle, as well as the concomitant weight, cost, and power required by traditional lighting topologies, distributed lighting systems are becoming increasingly viable for use within the vehicle. These distributed lighting systems are typically implemented as light conducting networks that use fiber optics or other waveguides to deliver light from a relatively small number of light sources to remote areas of the vehicle. Generally, these remote areas are illuminated by light which is emitted from the distal end of each waveguide in conjunction with some type of lensing device, which aids in focusing, dispersing, or otherwise affecting the emitted light pattern. Many light conducting networks have been proposed over the years that cover a wide spectrum of characteristics and features.

For example, U.S. Pat. No. 5,452,186, issued Sep. 19, 1995 to Dassanayake, discloses a light distribution system which utilizes a single light source and a multitude of waveguides to illuminate various components throughout a vehicle, such as an instrument panel, interior dome light, vanity mirror and sun visor. The light source is optically coupled to a ring of waveguides, which are generally oriented perpendicular to the light source in order to receive the incident light. The incident light is then delivered through the waveguides to remote locations, where it radiates out of the waveguides for illumination of an adjacent article or region of the vehicle interior.

Another apparatus for conducting light throughout a vehicle is disclosed in U.S. Pat. No. 5,465,194, issued Nov. 7, 1995 to Currie. The Currie patent discloses various embodiments for the delivery and illumination of light throughout a vehicle, and in one embodiment discloses a light conducting Y-branch. This Y-branch includes two input waveguides which are optically coupled to a single output waveguide at a junction. This junction is fitted with a plano-convex lens which focuses the incident light from both input waveguides and therefore transmits all of the entering light to the single waveguide without any radiation out of the junction. The Y-branch arrangement disclosed by Currie enables light of different wavelengths to be transmitted through the input waveguides and mixed at the junction to thereby control the color of light outputted by the single waveguide. This patent is typical of prior art Y-branch arrangements in that it is not designed to provide illuminating light from the junction; thus, any light exiting the junction is lost and wasted.

In areas other than vehicle lighting, light distribution for purposes of illumination has also been proposed using a network of waveguides. See, for example, U.S. Pat. No. 4,721,350, issued Jan. 26, 1988 to Mori, which discloses a light distribution network that can gather light from a single source and deliver it throughout an entire office building. In one particular embodiment, Mori discloses a branching optical junction which can act as a photo-radiator to thereby illuminate the surrounding area. This embodiment includes a main light conducting channel with a transverse bore extending through it and a secondary light conducting channel that fits within the transverse bore. The distal end of the secondary channel is a mirrored, angled end which extends into the bore and thereby obstructs the light traveling within the main channel. As the light travels along the main channel, it impinges the angled end which acts as a reflection surface, diverting at least a portion of the light out of the main channel. Typically, the diverted light is distributed to the secondary channel, which then delivers the light to a remote area. However, the angled end can be used as a reflecting element for illuminating the immediately surrounding area. Instead of diverting light into a secondary channel, the mirrored surface of the angled end is used to reflect the light out the other end of the bore, which is open. In this sense, light traveling along the main channel impinges this angled surface, and thereby reflects the incident light out of the open end of the bore and illuminates the surrounding area. The angled end can be positioned at various depths within the transverse bore, and can assume different angles, both of which affect the amount of light which is diverted.

The optical junction in the Mori patent utilizes two separate waveguides which are not permanently affixed to each other. While this allows the position of the secondary, or branching, waveguide to be adjusted to different depths within the transverse bore, such a construction is believed to be overly complex for an automotive interior lighting system and therefore unnecessarily expensive and difficult to implement.

Thus, there exists a need for a branching waveguide for automotive lighting systems and other such light distribution systems that makes use of the light exiting the waveguide at the branching junction.

SUMMARY OF THE INVENTION

In accordance with the present invention there is provided an illuminated interior article system for use as a part of a vehicle interior lighting system. It includes a branching optical waveguide and a vehicle interior article positioned relative to waveguide such that the illuminating light exiting the waveguide at its junction illuminates the vehicle interior article, whether by direct, indirect, or backlit illumination. The branching waveguide has a stem, first and second branches, and a junction that couples the stem to each of the branches. The stem and branches each comprise an elongated section of the waveguide formed from an optically-transmissive material that is capable of conducting light along its length by internal reflection of the light. The first and second branches extend away from the junction at an obtuse angle relative to the stem and the junction includes one or more optical features positioned at the junction such that a portion of the light traveling through one or more of the waveguide sections impinges upon the optical feature(s), with the optical feature(s) redirecting the impinging light out of the waveguide at the junction to thereby provide illuminating light from the junction. Rather than attempting to minimize light leakage at the waveguide junction, as is done in other branching waveguide light distribution systems, the waveguide of the present invention allows light to be selectively leaked from the junction for purposes of illumination.

The optical features used to radiate light out of the waveguide at the junction can be any of a wide variety of physical features which promote light leakage including notches, stipplings, optical coatings, or outer surface configurations of the waveguide that are oriented at an angle relative to the direction of the impinging light such that the light is directed out of the waveguide rather than being internally reflected.

BRIEF DESCRIPTION OF THE DRAWINGS

A preferred exemplary embodiment of the present invention will hereinafter be described in conjunction with the appended drawings, wherein like designations denote like elements, and.

DESCRIPTION OF THE PREFERRED EMBODIMENT

Figure 1:
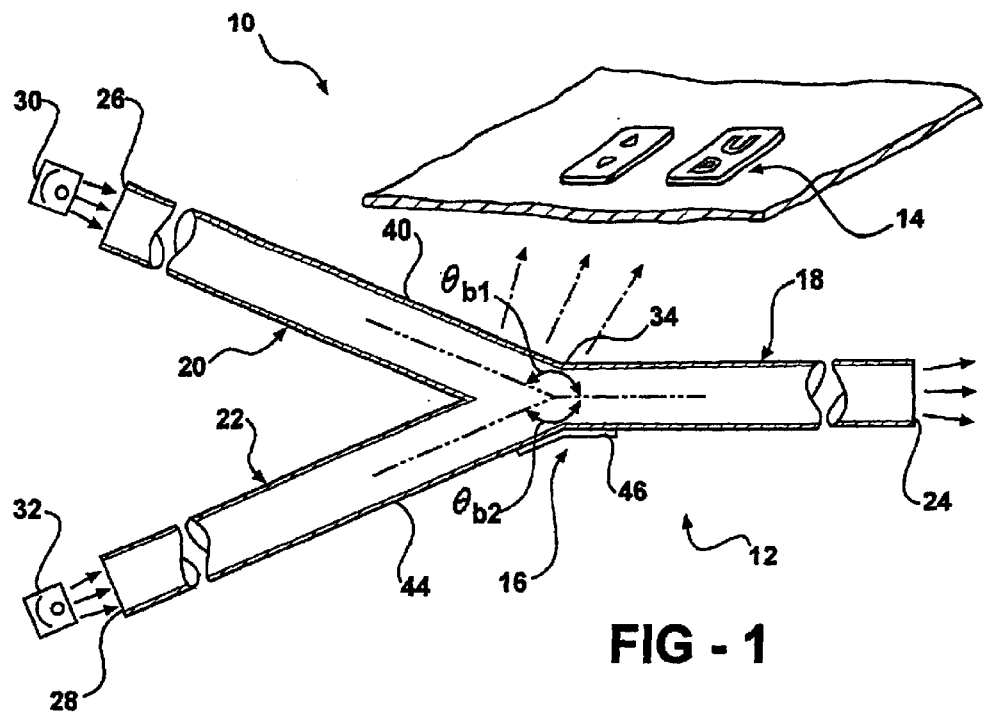
FIG. 1 depicts a first embodiment of an illuminating interior article system of the present invention.

With reference to the FIG. 1, there is shown an illuminated interior article system 10 that in general includes an optical waveguide 12 and a vehicle interior article 14, which can be any of a number of different automotive interior components for which illumination is desired. Optical waveguide 12 is in the form of what is generally referred to as a Y-branch and is constructed in accordance with the present invention in a manner that provides illuminating light out of the waveguide 12 at its junction 16. This enables the junction to be used not only to route light to different locations within the vehicle, but also to provide localized illumination of a nearby object or area. It will be appreciated that the views depicted in the various figures are primarily diagrammatic, it being understood that some or all of waveguide 12 would typically be located in a concealed location and used to provide direct, indirect, or backlighting of the interior article 14. Also, although a backlit membrane switch 14 is shown, it will be appreciated that the interior article can be any of a wide variety of components, including cupholders, storage bins and trays, door handles, assist grips, seat buckles, and instrument panel displays and gauges. Furthermore, it will also be appreciated that the light from junction 16 can be used for area illumination, whether it be as a dome light or as more localized illumination, such as a map light or foot well illumination.

Extending from junction 16 is a stem 18, a first branch 20, and a second branch 22, each of which comprise a separate, elongated section of waveguide 12 that is formed from an optically transmissive material, such as acrylic, which is capable of transmitting light along its length by internal reflection of the light. One or more of these sections are optically coupled to a light source, with the waveguide 12 being used to route light received from the light source to a plurality of locations within the vehicle where the light is used to illuminate various objects or areas. Apart from simply being a section of the waveguide 12, any or all of the sections 18, 20, 22 can include other features or components, such as mounting tabs, coatings, color filters, electronically-controlled optical baffles, lenses, and other optical components.

As shown, stem 18 extends from a terminal end 24 to junction 16. Similarly, branches 20, 22 each extend from a respective terminal end 26, 28 to junction 16. Each of the sections 18, 20, 22 are optically joined together by junction 16 whether as a unitary molded structure or by way of a secondary operation using, for example, extruded pieces of optically-transmissive material. In this regard, it is worth noting that while the various sections and elements of waveguide 12 are described separately, waveguide 12 is preferably one solid, homogeneous piece of light conducting material which does not have separable elements. These elements are only addressed individually for purposes of explaining the construction and optical properties of the waveguide.

Each branch extends from junction 16 at an obtuse angle relative to the direction of the stem section 18 at the point at which it connects to the branches at junction 16. As will be described below in connection with the various illustrated embodiments, junction 16 is constructed such that a portion of the light entering the junction is transferred from one of the branches into the stem, or vice-a-versa, while simultaneously radiating another portion of that received light out of waveguide 12 and into the surrounding area to provide illumination of some vehicle interior article or area. For this purpose, junction 16 includes one or more optical features that are positioned at the junction such that a portion of the light traveling through one or more of the waveguide sections 18, 20, 22 impinges upon the optical feature(s) and is redirected out of the waveguide at the junction. These optical features can be any of a wide variety of physical features which promote light leakage out of the waveguide 12 at junction 16, including notches, stipplings, optical coatings, or outer surface configurations of the waveguide that are oriented at an angle relative to the direction of the impinging light such that the light is directed out of the waveguide rather than being internally reflected on. In this regard, the optical features at junction 16 that results in illumination from the junction can be achieved by suitable selection of the angles between the branches 20, 22 and stem section 18 so that a portion of the light is leaked out. This and many of the various other optical features possible are discussed below in connection with FIGS. 1–14.

Figure 2:
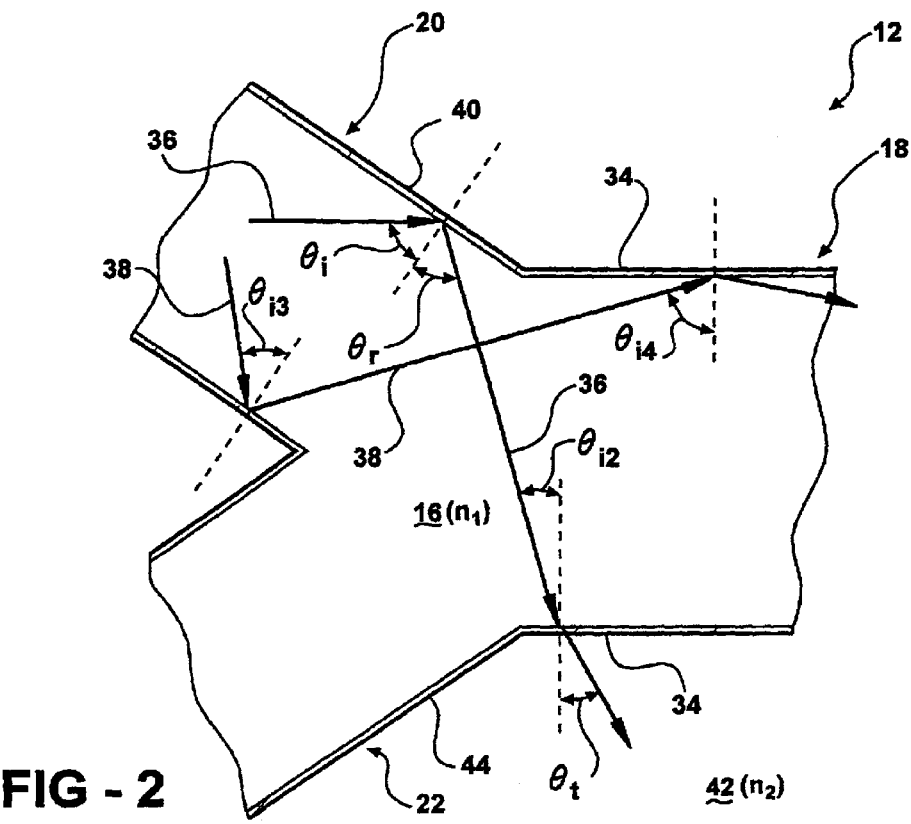
FIG. 2 is an enlarged, fragmentary view of the branching waveguide shown in FIG. 1.

Before discussing the various different optical features that can be utilized to radiate light out of the waveguide 12 at junction 16, some of the common optical properties and considerations used in the different embodiments will first be described in connection with the embodiment shown in FIGS. 1 and 2. In general, waveguide 12 conducts light along its branches and stem by internal reflection of the light. The light can be introduced into any of the sections of the waveguide, typically by directing the light into one of the ends 24, 26, and/or 28. In the embodiment of FIGS. 1 and 2, light is directed into each of the branches 20, 22 by light sources (illuminators) 30, 32, respectively. The two light sources can be used, if desired, to provide redundant illumination to stem 18 or to provide different brightness levels of light into stem 18 and out of the waveguide at junction 16. Although two illuminators are shown, it will of course be appreciated that a single source can be used. Similarly, the light can be inputted into the stem 18, with the junction 16 serving not only to provide localized illumination out of the waveguide, but also to split the remaining light between the two branches 20, 22.

The light from illuminators 30, 32 travels along each branch by internal reflection and is delivered by the branches to the junction 16. Once the light enters junction 16, a first portion of the total light impinges on outer junction surface 34 of waveguide 12 at an angle less than the critical angle of the material. As is commonly known in the art, this portion of light is refracted out of junction 16, instead of being totally internally reflected back into the waveguide. The remaining portion of the light entering junction 16 impinges on surface 34 at an angle greater than the critical angle and therefore internally reflects and is transmitted along to stem section 18. Thus, in this embodiment, each of the branches 20, 22 are disposed at an obtuse angle ($\theta_{b1}$, $\theta_{b2}$) relative to stem 18 such that the outer surface 34 is oriented to direct a portion of the light out of the waveguide 12 at junction 16. For this purpose, the proper orientation of outer surface 34 is achieved by suitable selection of the branch angles relative to stem section 18 as well as the dimensions of the branches and stem in the area of junction 16.

More specifically, reference is made to FIG. 2 where the paths of individual light rays 36, 38 originating from light source 30 is shown. In FIG. 2, light ray 36 travels along branch 20, internally reflecting at an angle $\phi$ with respect to its outer surface 40. The angle of incidence ($\theta_i$) is defined as the angle between the light ray 36 and the line normal to outer surface 40 at the point of impingement:

Angle of Incidence $\theta_i = 90° - \phi$.

The outside environment 42 has an index of refraction ($n_2$), which is less than the index of refraction ($n_1$) for branch 20. At the point where ray 36 strikes outer surface 40, if the angle of incidence ($\theta_i$) is greater than the critical angle ($\theta_c$), the ray will be totally internally reflected back into branch 20, as commonly known in the art. The critical angle can be determined according to the equation:

Critical angle $\theta_c = \sin^{-1}(n_2/n_1)$.

Therefore, light rays which impinge outer surface 40 at an angle greater than the critical angle ($\theta_i > \theta_c$) will be totally internally reflected back into branch 20 and will continue to travel along the length of the branch towards junction 16. This analysis applies equally to the light generated from light source 32 that impinges upon the outer surface 44 of second branch 22.

Once the light originating from illuminators 30, 32 is delivered to junction 16, the relative amount of light that is passed to stem 18 versus the amount that is radiated out of the waveguide depends upon the angle of incidence of the light with the outer surface 34 at the stem section. This angle is dependent on both the relative angle $\theta_{b1}$ between the branch and stem, as well as the angle at which the light ray enters the junction 16. For example, ray 36 impinges outer surface 40 at an angle $\theta_i$ and is totally internally reflected back into branch 20, as previously described. Even though ray 36 is reflected from outer surface 40 at an angle $\theta_r$ which is equal to $\theta_i$ ($\theta_i = \theta_r$), ray 36 will impinge the outer surface 34 at junction 16 with an angle of incidence $\theta_{i2}$ which is different than $\theta_i$ (i.e., $\theta_{i2} \neq \theta_i$). This difference in incident angles is due to the fact that outer surfaces 40 and 34 are not parallel, and results in $\theta_{i2} < \theta_i$. Furthermore, for the illustrated light ray 36, its angle of incidence $\theta_{i2}$ is less than the critical angle $\theta_c$, resulting in the ray 36 radiating out of the waveguide 12 at junction 16. As is known, the angle $\theta_t$ at which the light ray 36 leaves the waveguide is governed by Snell's law:

Snell's Law $n_1 \sin \theta_{i2} = n_2 \sin \theta_t$, which can be rewritten to determine the exit angle:

$\theta_t = \sin^{-1}[(n_1/n_2) \sin \theta_{i2}]$.

Other light entering junction 16 will be passed on by internal reflection to stem 18. For example, light ray 38 impinges outer surface 40 at an angle $\theta_{i3}$, which is greater than the critical angle ($\theta_{i3} > \theta_c$), such that the ray is internally reflected by outer surface 40 as it travels along branch 20. It then enters junction 16 and strikes outer surface 34 at an angle $\theta_{i4}$, that is greater than the critical angle, thereby being internally reflected and passing along into stem section 18. This transmitted light has therefore passed through junction 16 into stem 18 without radiating out of the waveguide 12. Thus, it will be appreciated that one portion of the light entering junction 16 is radiated out of the waveguide 12 and can be used for illumination purposes, while the remaining portion of the light is passed on through waveguide 12 and can be used remotely for other illumination purposes. As will also be appreciated, the amount of light exiting the waveguide at junction 16 of this embodiment depends upon the angle of outer surface 40 relative to surface 34 (i.e., the angle $\theta_{b1}$) as well as the maximum internally-reflected angle of the light traveling through branch 20 relative to its longitudinal axis, with this latter factor depending upon the entry angles of the light from illuminator 30.

Referring back momentarily to FIG. 1, directional control of the light radiated out of waveguide 12 at its junction 16 can be achieved using, for example, a reflective coating 46 applied to a portion of the outer surface of junction 16. In this way, the light ray 36 shown in FIG. 2 can be reflected back into the waveguide at the lower side of junction 16 so that it will instead exit out of the upper part of junction 16 toward the vehicle interior article 14. In addition to or in lieu of reflective coating 46, other optical coatings which also affect light leakage out of waveguide 12 at junction 16 can be used. For example, a light-transmissive optical coating can be used to alter the critical angle $\theta_c$ and consequently could be used to either promote or further restrict light from escaping through the outer surface 34.

Figure 3:
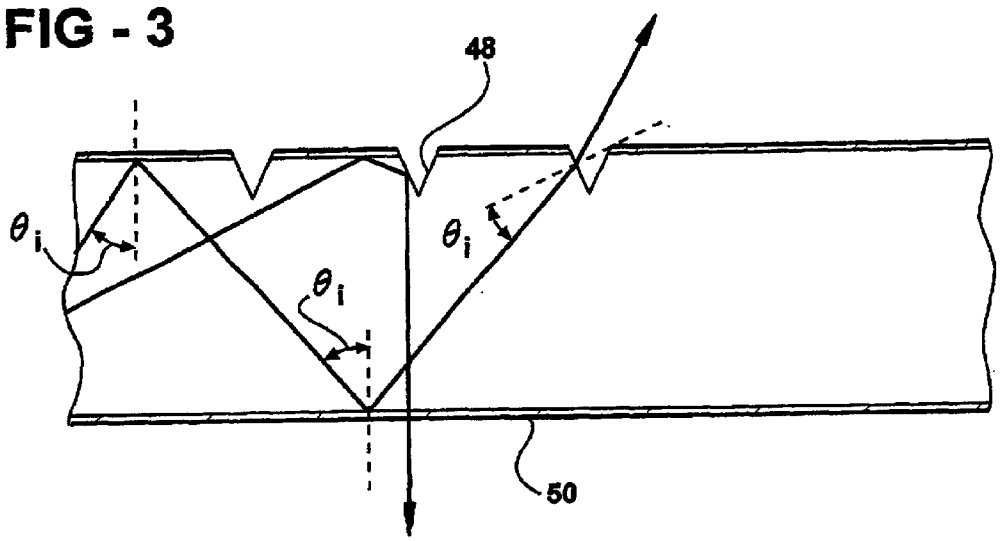
FIG. 3 is an enlarged, fragmentary view of a first alternative branch segment of the waveguide of FIG. 1 using notches to produce lateral illumination from the waveguide.
Figure 4:
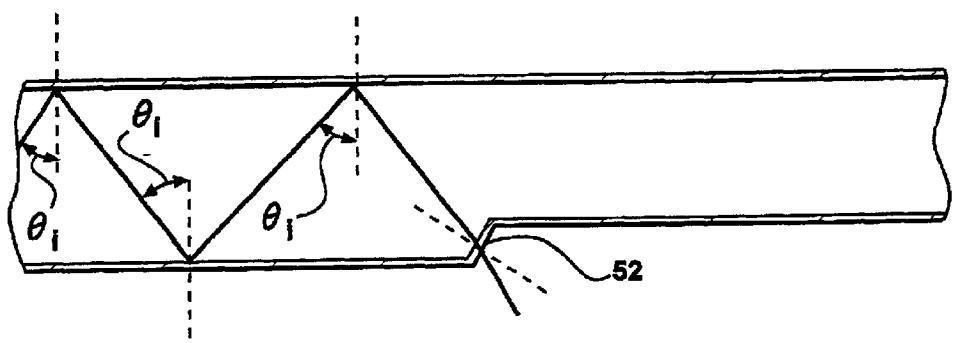
FIG. 4 is an enlarged, fragmentary view of a second alternative branch segment of the waveguide of FIG. 1 using a stepped portion to promote light leakage from the branch segment.

The individual sections 18, 20, 22 of waveguide 12 can have any of a variety of different cross-sectional shapes and dimensions, as will be appreciated by those skilled in the art. Also, the sections can have differing lengths, one or more bends, and other geometric and optical features in accordance with the particular application for which waveguide 12 is used. For example, as shown in FIG. 3, notches 48 can be used to provide lateral illumination out of the waveguide 12 at one or more locations. See also U.S. Pat. No. 5,432,876 to Appeldorn et al. which discloses notching arrangements for providing such lateral illumination. Conversely, paint 50 or some other optical coating can be used on the branches and/or stem sections to reduce light leakage out of those sections. As shown in FIG. 4, a step down 52 in the thickness of the waveguide can also be used in a manner similar to notching to remove light from any of the sections of the waveguide for purposes of illuminating either an adjacent interior article or an area within the vehicle.

Figure 5:
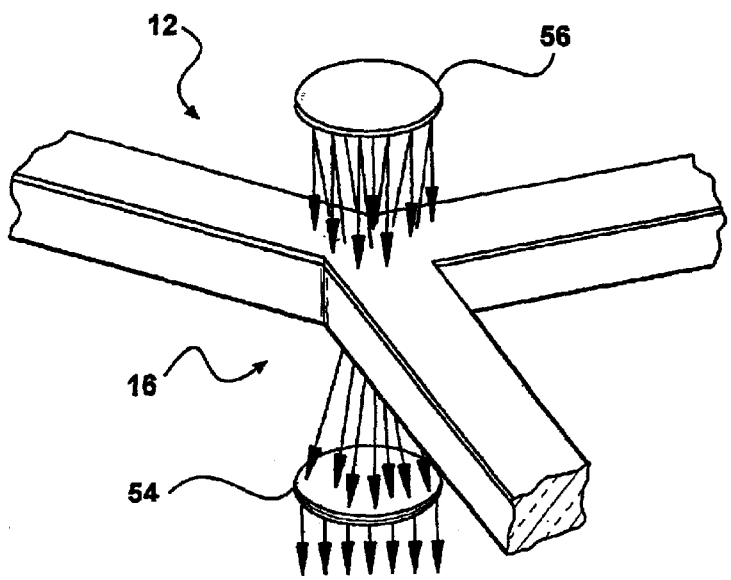
FIG. 5 depicts the use of a reflector and optical lens in conjunction with the waveguide of FIG. 1 to control the direction and dispersion of light from the junction of the waveguide.
Figure 12:
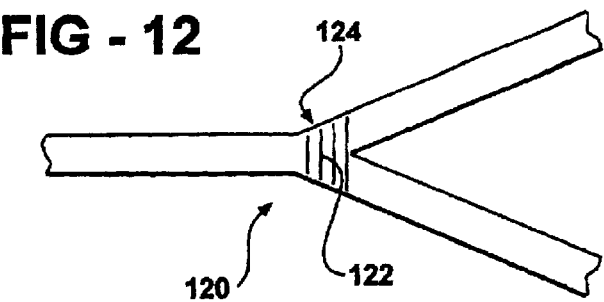
Figure 13:
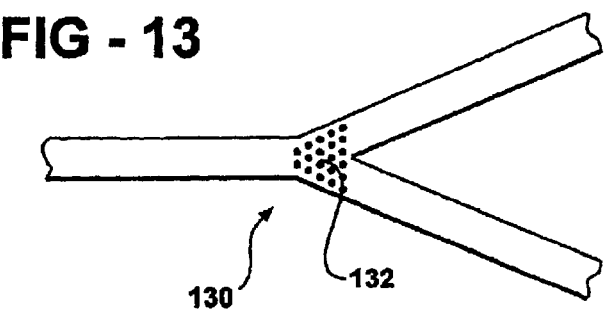

As shown in FIG. 5, various optical components can be used in connection with junction 16 to affect the light emission pattern out of the waveguide. Examples of these optical components include lenses, reflectors, filters, and other types of devices which can be used to effect a light pattern. For instance, a lens 54 could be mounted adjacent to junction 16, such that the light which radiates out of junction 16 strikes the lens 54 and consequently is focused, directed, dispersed, or otherwise optically treated. Implementation of this design could aid in illuminating particular interior articles, or in gathering the emitted light to make a more efficient use of it. Also, rather than using the reflective coating 46 of FIG. 1 to control the direction of lateral illumination from the junction 16, a separate reflector 56 can be used. Thus, for example, if the waveguide 12 is mounted in the headliner area of a vehicle interior and light radiates out of junction 16 in a omni-directional manner, reflector 56 can be mounted directly above the junction such that it was able to gather the light which was radiated upwards and redirect it downwards towards an article or area within the vehicle interior. For the relative location of the lens 54 and reflector 56 shown in FIG. 5, surface treatments of the waveguide 12 at junction 16 can be used to remove a portion of the light. Examples of suitable surface treatments are shown in FIGS. 12 and 13 and are discussed further below. It will of course be understood that the lens and reflector shown in FIG. 5 could alternatively be positioned beside the junction rather than above and below it, and that both a lens and reflector need not necessarily be used together, the particular configuration being dependent upon the needs of a particular lighting application.

Figure 6:
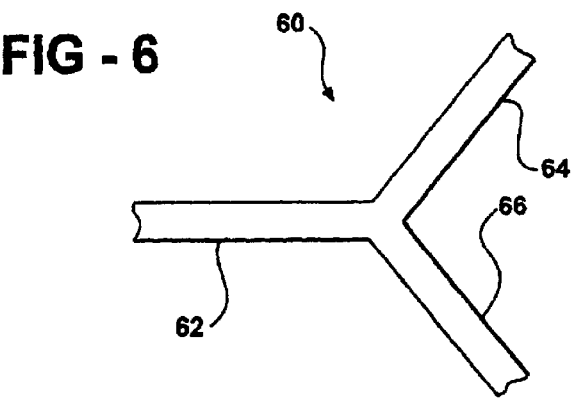
FIGS. 6–14 depict various alternative embodiments of the waveguide of FIG. 1 that use different optical features to control the radiation of light out of the waveguide at the junction.
Figure 7:
Figure 8:
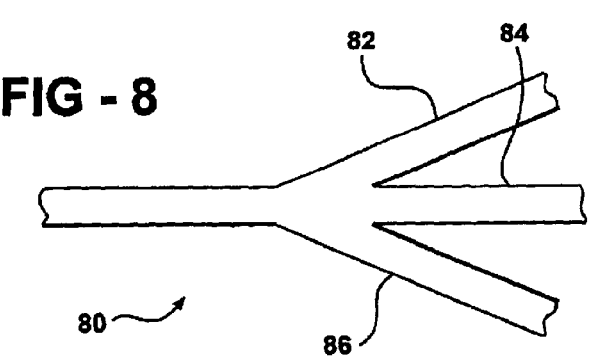
Figure 9:
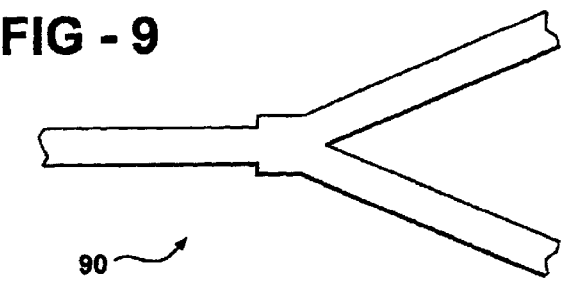
Figure 10:
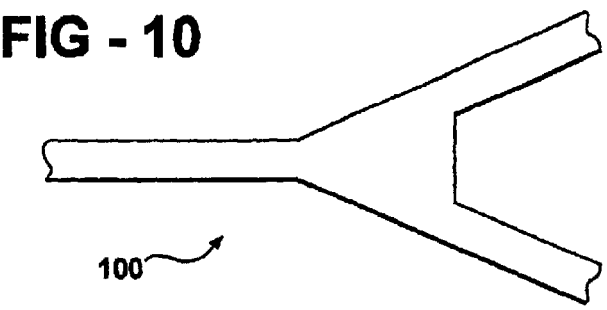
Figure 11:
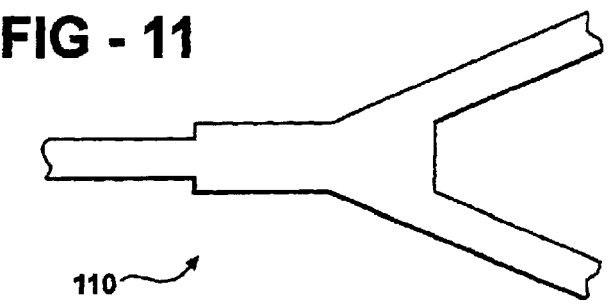

Referring now to FIGS. 6–17, a number of other embodiments of a Y-branch illuminating waveguide of the present invention are shown. The wide-branching waveguide 60 of FIG. 6 is similar to that of FIG. 1, except that the obtuse angle between the stem 62 and the branches 64, 66 is much smaller than that of FIG. 1. The tapped waveguide 70 of FIG. 7 can be used to achieve an unequal division or contribution of light between the two branches 72, 74, whether by illumination originating from the stem 76 or the branches themselves. As shown in FIG. 8, a waveguide 80 can have more than two branches; here, three branches 82, 84, 86 are shown. Increased illumination from the junction can be achieved using either the stepped junction of waveguide 90 in FIG. 9, the expanded-area waveguide 100 of FIG. 10, or a combination of the two, as shown by waveguide 110 of FIG. 11. Instead of different surface configurations at the junction, surface features and/or treatments of the junction can be used. For example, the waveguide 120 of FIG. 12 includes notches 122 to promote light leakage at the junction 124 of that waveguide. Similarly, the waveguide 130 of FIG. 13. includes stippling 132 for the same purpose. These surface features of FIGS. 12 and 13 would not affect the indices of refraction like a light-transmissive optical coating, but would alter the various angles at which the light strikes the outer surfaces of the light conducting channels, thereby promoting localized radial illumination at the junction where the features are located.

Figure 14:
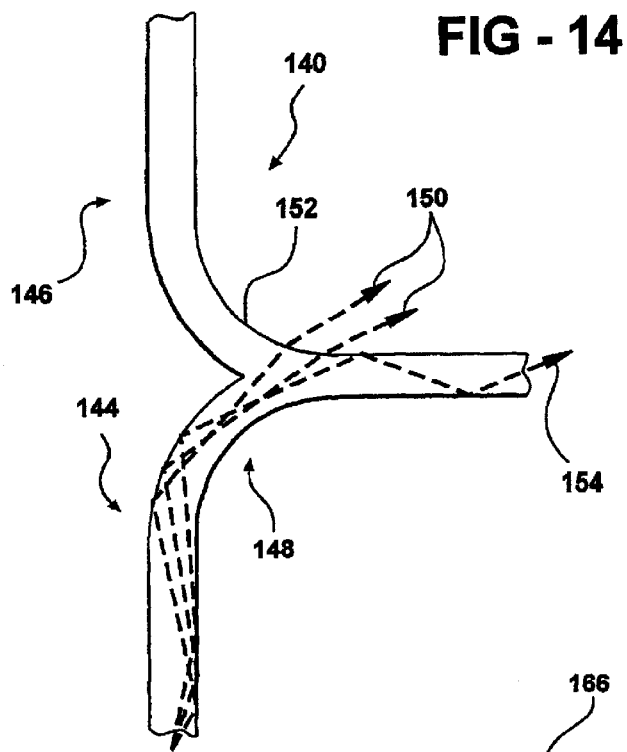

Referring now to FIG. 14, another waveguide embodiment 140 is disclosed which includes a stem section 142 and first and second branches 144, 146 which curve outwardly away from the junction 148. This embodiment alters the radiation pattern as well as the amount of radiation emitting from junction 148. Light rays 150 entering branch 144 will reflect within the bent section of branch 144 and then impinge outer surface 152 at angles which are less than the critical angle; consequently, they are transmitted out of the junction 148 into the surrounding area. The remaining rays, such as light ray 154, will impinge outer surface 152 at an angle beyond the critical angle of that interface, thereafter traveling down the length of stem section 142 to some remote location. It will of course be appreciated that numerous designs could be used which bend the branches as they enter junction 148 at different angles in order to affect the light emission at the junction.

Figure 15:
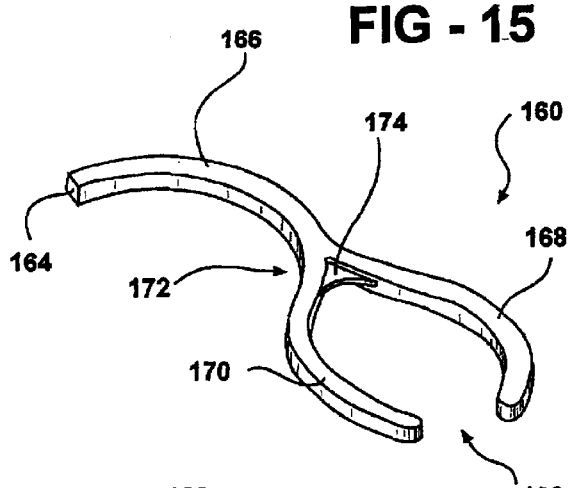
FIG. 15 shows a first embodiment of a cupholder illuminating waveguide utilizing a Y-branch construction in accordance with the present invention.

One practical implementation of a Y-branch illuminating waveguide of the present invention is a cupholder illuminating waveguide 160 such as is shown in FIG. 15. This "wishbone" shaped waveguides 160 is configured for cupholders (not shown) having a gap 162 to accommodate a mug handle. Light for the waveguide 160 enters the input 164 of stem 166 and is split essentially equally to the two branches 168, 170 of the wishbone. To prevent a dark area in the illumination of the cupholder at the junction 172, an optical feature in the form of a web portion 174 is included at the junction 172 between the two branches 168, 170. The web portion is thinner than the rest of the waveguide 160 (although it need not be) and provides additional illumination to the portion of the interior of the cupholder directly beneath the junction 172.

Figure 16:
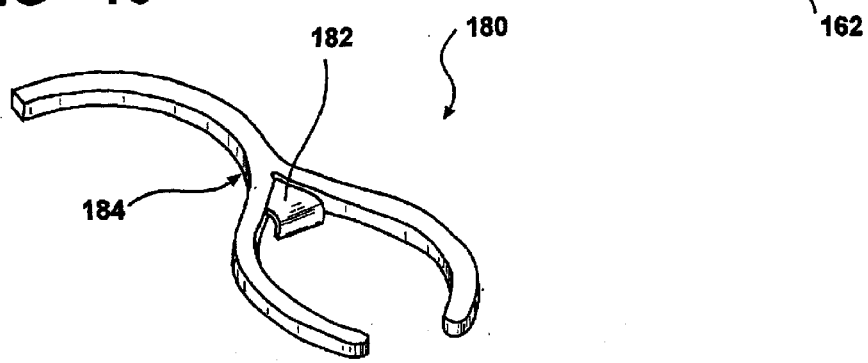
FIG. 16 shows a second embodiment of a cupholder illuminating waveguide of the present invention.

Alternatively, as shown in FIG. 16, a cupholder illuminating waveguide 180 can utilize an optical feature in the form of a tab 182 that is thinner than the rest of the waveguide 180 and that extends downward from the junction 184 to reflect and/or transmit light toward the bottom of the cupholder. The tab 182 has a generally rectangular cross-section and curves downward toward the bottom of the cupholder.

Figure 17:
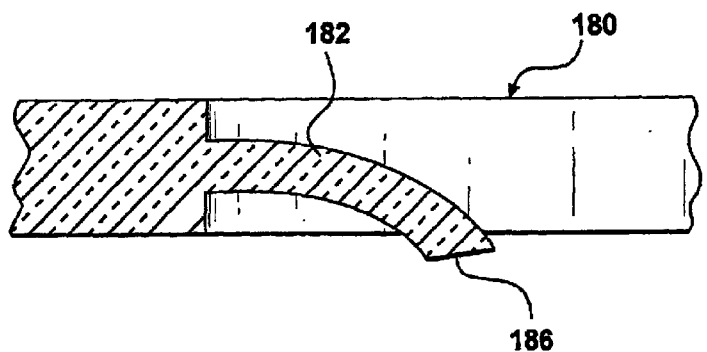
FIG. 17 is an enlarged, fragmentary view of the cupholder waveguide of FIG. 16.

As shown in FIG. 17, the tab 182 may have a chamfered leading edge 186.

Figure 18:
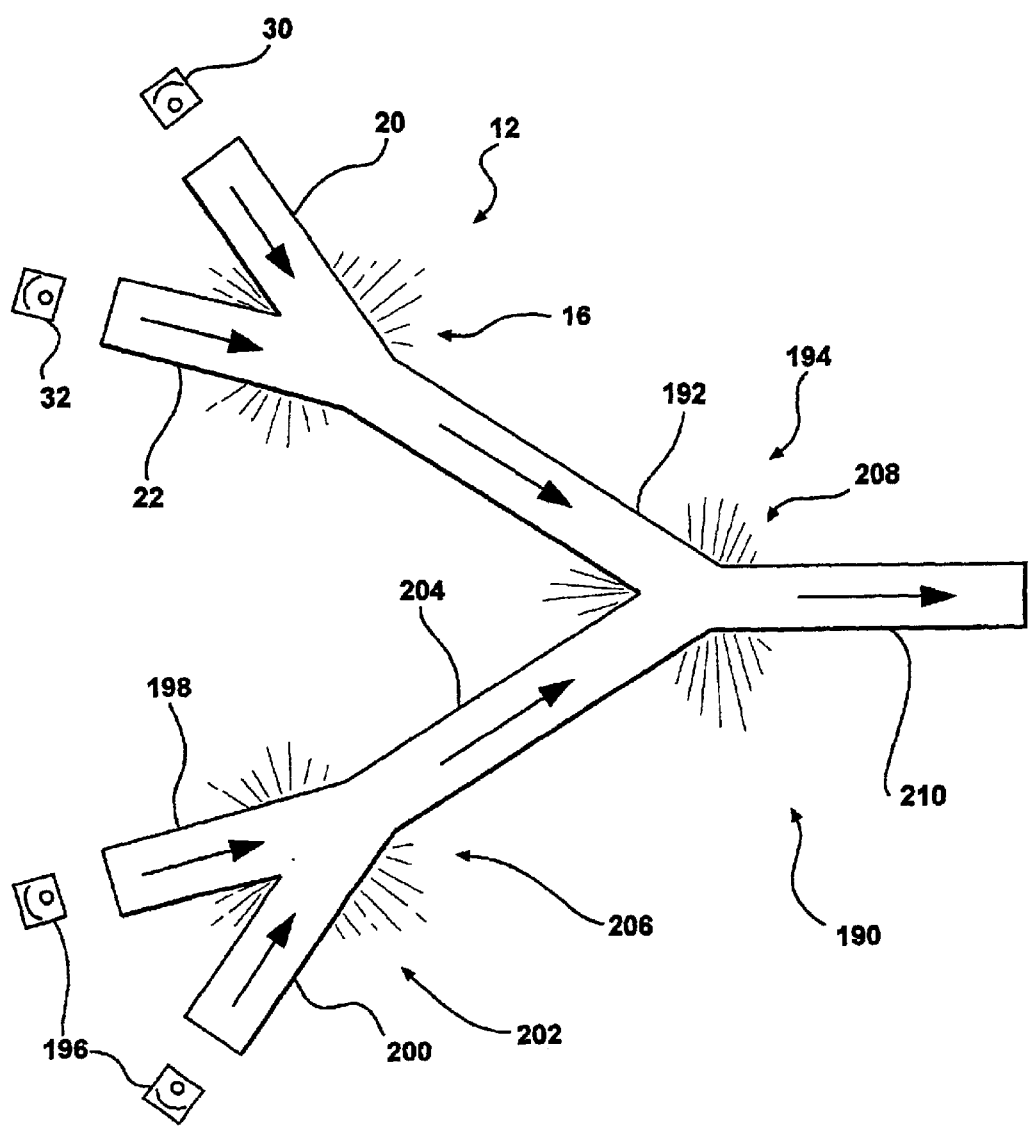
FIG. 18 depicts an optical waveguide network which utilizes the branching waveguide of FIG. 1.

Turning next to FIG. 18, waveguide 12 of FIG. 1 can be a part of a larger network 190 of waveguides, with the network including one or more other Y-branch waveguides, if desired. The illustrated network utilizes the transmitted light from one Y-branch waveguide to supply the adjacent waveguide. The light can originate from the stem or one or more branches. As shown, the light sources 30, 32 supply the first and second branches 20, 22 of waveguide 12 with illumination. A portion of the total light within waveguide 12 is radiated out of the device at its junction 16, while the remaining portion is transmitted to a first branch 192 of another branching waveguide 194. A second set of light sources 196 supply the branches 198, 200 of a third waveguide 202 with illumination, with this waveguide being configured to pass all or substantially all of the illumination through the junction to its stem 204 without any significant light leakage at the junction 206. Of course, the junction 206 could be configured if desired to radiate a portion of the total light out of the waveguide junction. Waveguide 194 is therefore receiving incident light from the stem sections of the two outer waveguides 12, 202, instead of from independent light sources. A portion of the light received by waveguide 194 is radiated out of the device at its junction 208, while the remaining portion is transmitted to its stem section 210. As will be appreciated, numerous combinations of waveguides could be coupled together to form various network configurations, with the construction of the network being determined by the specific parameters and requirements of the particular application for which the network is used.

It will thus be apparent that there has been provided in accordance with the present invention an illuminated interior article system and Y-branch waveguide therefor which achieves the aims and advantages specified herein. It will, of course, be understood that the foregoing description is of preferred exemplary embodiments of the invention and that the invention is not limited to the specific embodiments shown. Various changes and modifications will become apparent to those skilled in the art and all such changes and modifications are intended to be within the scope of the present invention.

I claim:

1. An illuminating waveguide for use in distributed lighting, comprising:
    an optical waveguide having a stem, first and second branches, and a junction that couples said stem to each of said brunches;
    said stem comprising an elongated section of said waveguide formed from an optically-transmissive material;
    each of said branches also comprising an elongated section of said waveguide formed from an optically-transmissive material, with at least one of said first and second branches extending away from said junction at an obtuse angle relative to said stem;
    said junction including one or more optical features positioned at said junction such that light traveling through one or more of said sections of said waveguide at least partially impinges upon said optical feature(s), with said optical feature(s) redirecting the impinging light out of said waveguide at said junction to thereby provide illuminating light from said junction.

2. An illuminating waveguide as defined in claim 1, wherein said optical feature(s) at said junction includes an optical coating which affects light leakage out of said waveguide at said junction.

3. An illuminating waveguide as defined in claim 1, wherein said optical feature(s) at said junction includes surface features which promote light leakage out of said waveguide at said junction.

4. An illuminating waveguide as defined in claim 1, wherein said optical feature(s) at said junction includes at least one surface of said waveguide oriented to direct light out of said waveguide at said junction.

5. An illuminating waveguide as defined in claim 1, wherein said optical feature(s) include an outer surface of said first branch with said outer surface being oriented relative to an outer surface of said stem such that internally reflected light traveling along said stem and impinging upon said outer surface of said first branch is refracted out of said waveguide at said outer surface of said first branch.

6. An illuminating waveguide as defined in claim 1, wherein said stem and branches together comprise a unitary waveguide.

7. An illuminating waveguide as defined in claim 1, wherein at least one of said two branches has surface features which provide lateral illumination out of said waveguide at said one branch.

8. An illuminating waveguide as defined in claim 1, wherein at least one of said branches has an optical coating which reduces light leakage out of said waveguide at said one branch.

9. An illuminating waveguide as defined in claim 1, wherein at least one of said two branches is curved along at least a portion thereof.

10. An illuminating waveguide as defined in claim 1, wherein said waveguide comprises a first waveguide portion and said illuminating waveguide further comprises a second waveguide portion having a stem, first and second branches, and a junction, wherein at least one of said branches or stem of said first waveguide portion is optically coupled to at least one of said branches or said stem of said second waveguide portion such that light can travel through said waveguide portions from one of said junctions to the other of said junctions.

11. An illuminating waveguide for use in distributed lighting, comprising:
    an optical waveguide having a stem, first and second branches and a junction that couples said stem to each of said branches;
    said stem comprising an elongated section of said waveguide formed from an optically-transmissive material;
    each of said branches also comprises an elongated section of said waveguide formed from an optically-transmissive material, with said first and second branches extending away from said junction at an obtuse angle relative to said stem;
    said junction including one or more optical features positioned at said junction such that light traveling through one or more of said section of said waveguide at least partially impinges upon said optical feature(s), with said optical feature(s) redirecting the impinging light out of said waveguide at said junction to thereby provide illuminating light from said junction, and;
    wherein said first and second branches extend divergently away from said junction and then converge towards each other with said first mad second branches each terminating at respective first and second ends that are separated from each other by a gap.

12. An illuminating waveguide as defined in claim 11, wherein said branches together form a generally circular waveguide portion and wherein said optical waveguide comprises a cupholder illuminating waveguide.

13. An illuminating waveguide as defined in claim 12, wherein said optical feature(s) at said junction comprise a web portion extending from said junction between said first and second branches.

14. An illuminating waveguide as defined in claim 12, wherein said optical feature(s) at said junction comprise a tab extending from said junction and curving downward away from said branches.

15. An illuminated interior article system for use in a vehicle, comprising:
    an optical waveguide having a stem, first and second branches, and a junction that couples said stem to each of said branches;
    said stem comprising an elongated section of said waveguide formed from an optically-transmissive material each of said branches also comprising an elongated section of said waveguide formed from an optically-transmissive material with at least one of said first and second branches extending away from laid junction at an obtuse angle relative so said stem;

said junction including one or more optical features positioned a; said junction such that light traveling through one or more of said sections of said waveguide at least partially impinges upon said optical feature(s), with said optical feature(s) redirecting the impinging light out of said waveguide at said junction to thereby provide illuminating light from said junction; and a vehicle interior article positioned relative to said junction such that the illuminating light exiting said waveguide at said junction illuminates said vehicle interior article.

16. An illuminated interior article system as defined in claim 15, wherein said optical feature(s) at said junction includes surface features which promote light leakage out of said waveguide at said junction.

17. An illuminated interior article system as defined in claim 15, wherein said optical feature(s) at said junction includes at least one surface of said waveguide oriented to direct light out of said waveguide at said junction.

18. An illuminated interior article system as defined in claim 15, wherein said optical feature(s) include an outer surface of said first branch with said outer surface being oriented relative to an outer surface of said stem such that internally reflected light traveling along said stem and impinging upon said outer surface of said first branch is refracted out of said waveguide at said outer surface of said first branch.

19. An illuminated interior article system as defined in claim 15, wherein at least one of said two branches has surface features which promote light leakage out of said waveguide at said one branch.

20. An illuminated interior article system as defined in claim 15, further comprising an optical lens exterior to said waveguide and positioned relative to said junction much that at least a portion of the light which exits said waveguide at said junction impinges upon said lens and is directed by said lens onto said interior vehicle article.

21. An illuminated interior article system as defined in claim 15, further comprising a reflective component positioned relative to said junction such that at least a portion of the light exiting said waveguide at said junction impinges upon and is reflected by said reflective component.

22. An illuminated interior article system as defined in claim 15, wherein said waveguide comprises a first waveguide and said system further comprises a second waveguide having a stem, first and second branches, and a junction, wherein at least one of said branches or stem of said first waveguide is optically coupled to at least one of said branches or said stem of said second waveguide such that light can travel through said waveguides from one of said junctions to the other of said junctions.

* * * * *

UNITED STATES PATENT AND TRADEMARK OFFICE
CERTIFICATE OF CORRECTION

| | | |
|---|---|---|
| PATENT NO. | : 6,733,166 B2 | Page 1 of 1 |
| APPLICATION NO. | : 10/097697 | |
| DATED | : May 11, 2004 | |
| INVENTOR(S) | : George Robert Hulse | |

It is certified that error appears in the above-identified patent and that said Letters Patent is hereby corrected as shown below:

Column 9, line 30: "brunches" should read -- branches;
Column 10, line 44: "first mad second" should read -- first and second;
Column 11, line 4: "laid" should read -- said;
Column 11, line 4: "so" should read -- to;
Column 11, line 6: "a;" should read -- at;

Signed and Sealed this
Twenty-eighth Day of June, 2011

David J. Kappos
*Director of the United States Patent and Trademark Office*